US012744302B2

(12) United States Patent
Hettinger et al.

(10) Patent No.: US 12,744,302 B2
(45) Date of Patent: Sep. 22, 2026

(54) ROCK GUARD FOR GNSS SIGNAL AVOIDANCE

(71) Applicant: Caterpillar Inc., Peoria, IL (US)

(72) Inventors: Daniel R. Hettinger, Monticello, IL (US); Earl Richard Thompson, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 317 days.

(21) Appl. No.: 18/443,218

(22) Filed: Feb. 15, 2024

(65) Prior Publication Data

US 2025/0266600 A1 Aug. 21, 2025

(51) Int. Cl.
*H01Q 1/00* (2006.01)

(52) U.S. Cl.
CPC .................................. *H01Q 1/002* (2013.01)

(58) Field of Classification Search
CPC ..... H01Q 1/002; H01Q 1/1242; H01Q 1/3275
See application file for complete search history.

(56) References Cited

U.S. PATENT DOCUMENTS

| | | | | |
|---|---|---|---|---|
| 3,462,187 A | | 8/1969 | Hassler | |
| 4,370,658 A | * | 1/1983 | Hill | H01Q 1/38 343/873 |
| 11,078,789 B2 | | 8/2021 | Whiteley et al. | |
| 11,400,848 B2 | | 8/2022 | Arul | |
| 2014/0175834 A1 | * | 6/2014 | Karami | B60S 1/566 296/190.03 |
| 2016/0272101 A1 | * | 9/2016 | Vitale | B60P 1/045 |
| 2022/0328950 A1 | | 10/2022 | Mamer et al. | |
| 2022/0332237 A1 | * | 10/2022 | Vincan | B60P 1/16 |

FOREIGN PATENT DOCUMENTS

| | | |
|---|---|---|
| CN | 103826940 A | 5/2014 |
| CN | 109184690 | 1/2019 |
| CN | 110001569 | 7/2019 |
| CN | 215117267 | 12/2021 |
| WO | 2019013997 A1 | 1/2019 |

OTHER PUBLICATIONS

Written Opinion and International Search Report for Int'l. Patent Appln. No. PCT/US2025/013385, mailed May 13, 2025 (12 pgs).

* cited by examiner

*Primary Examiner* — Karen Beck

(57) ABSTRACT

A haul truck can include a frame, a traction system for moving the frame, an access platform coupled to the frame, a truck bed having a canopy extending over the access platform, an antenna support structure arranged on the access platform, the antenna support structure extending upward to support a GNSS receiver positioned proximate a front of the canopy, and a non-metallic protective barrier coupled to the canopy and positioned towards the front of the canopy and positioned to deflect objects from striking the GNSS receiver.

20 Claims, 5 Drawing Sheets

ROCK GUARD FOR GNSS SIGNAL AVOIDANCE

TECHNICAL FIELD

The present disclosure generally relates to a work machine. More particularly, the present disclosure relates to a rock guard for a haul truck.

BACKGROUND

Work machines and other vehicles can include antennas or other communication devices for wirelessly transmitting and/or receiving signals. Receiver antennas for accessing global navigational satellite systems (GNSS), such as global positioning systems (GPS), may be present on vehicles or work machines for helping to identify positional information of vehicles or work machines. For example, and particularly in the context of autonomous work machines, positional information may be used by remote operators or operator systems to manipulate autonomous work machines on a job site, a project, a mining operation, or for other purposes.

In the context of haul trucks, such as quarry trucks, mining trucks, or other heavy equipment type trucks, finding or providing mounting locations for antennas may be a difficult problem. That is, for example, haul trucks may include a very large truck bed that may include a canopy extending forward from the truck bed and above the cab of the truck to protect the cab from falling rock or other damaging debris. GNSS receiver antennas, in particular, may perform better when they have a 360 degree field of view. Given the nature of haul trucks, finding a mounting location that allows the antennas to extend above the top of the rest of the parts of the truck to provide a 360 degree field of view may often involve a support structure that extends from a service or access platform around the cab. However, this leaves the receiver antenna exposed to falling rocks and other material.

CN 215117267 discusses a truck having a communication device which is provided with a protective cover so that falling rocks in a mining area are prevented from hitting the communication device.

SUMMARY

In an example according to this disclosure, a haul truck can include a frame, a traction system for moving the frame, an access platform coupled to the frame, a truck bed having a canopy extending over the access platform, an antenna support structure arranged on the access platform, the antenna support structure extending upward to support a GNSS receiver positioned proximate a front of the canopy, and a non-metallic protective barrier coupled to the canopy and positioned towards the front of the canopy and positioned to deflect objects from striking the GNSS receiver.

In one example, a canopy extension for a haul truck can include a non-metallic protective barrier coupled to a canopy of the haul truck and positioned towards a front of the canopy and positioned to deflect objects from striking a GNSS receiver, which is positioned proximate the front of the canopy.

In one example, a method of protecting a GNSS receiver mounted on a haul truck can include providing a non-metallic protective barrier, and mounting the non-metallic protective barrier towards a front of a canopy of the haul truck to provide a canopy extension positioned to deflect objects from striking a GNSS receiver which is positioned proximate the front of the canopy.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
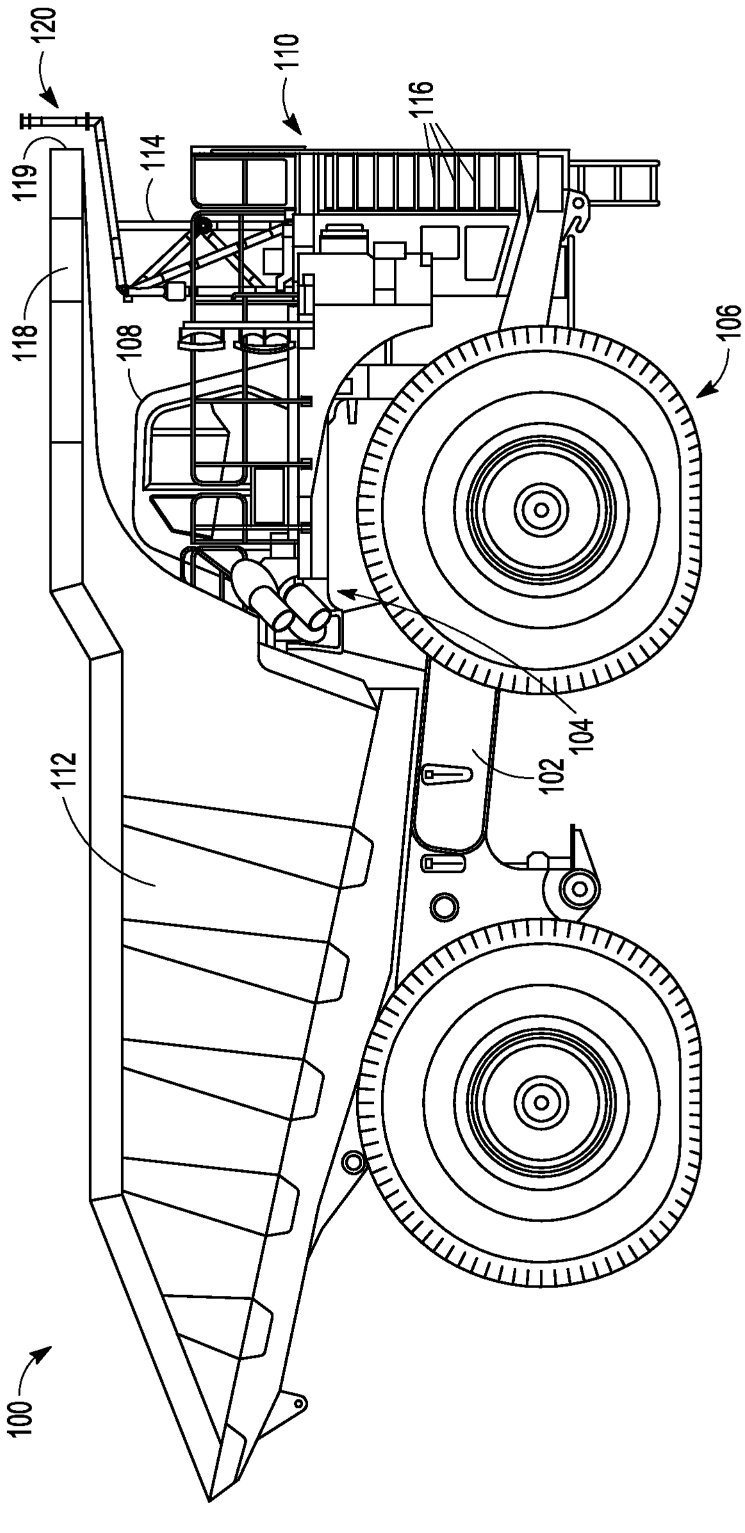
FIG. 1 shows a side view of a haul truck, in accordance with one embodiment.

FIG. 1 is a perspective view of a haul truck 100. The haul truck may be configured for hauling heavy rock, debris, equipment, or other items. In one or more embodiments, for example, the haul truck may be adapted for working in a rock quarry, for example, where rock mining and digging is performed and the mined material is in need of transport to crushers, other processing equipment, or to trucks more suitable for over-the-road transport. As shown, the haul truck 100 may include a frame 102, an engine 104 positioned on the frame, a traction system 106, a cab 108, an access platform 110, a truck bed 112, and an antenna support structure 114 for a receiver 120.

The haul truck frame 102 may be configured to support the loads imparted on the truck and transfer the loads the traction components. The frame may, thus, extend between rear and front components of the traction system 106 and provide a support point for the truck bed 112 and a support system for the engine 104. The frame 102 may also extend forward of the front component of the traction system 106 to provide support for the access platform 110, the cab 108, the antenna support structure 114 and other features of the haul truck 100.

The engine 104 may be adapted to provide power to the haul truck 100. In particular, the engine 104 may be adapted to provide motive power to the traction system 106 to allow the haul truck 100 to be driven from place to place and may provide power to a hydraulic or other actuation system for the truck bed 112, for example. In one or more embodiments, the engine 104 may include an internal, or external, combustion engine. Alternatively, or additionally, electric power may be provided via a turbine or battery source and an electric motor may be provided for powering the traction system 106 and/or the hydraulic system. Still other sources of power may be provided.

The traction system 106 may be configured for moving the haul truck 100 relative to a ground surface. The traction system 106 may include a system of wheels, as shown, or a track type system may be provided. Still other traction systems may be provided.

The cab 108 may be configured to provide a location for an operator to operate the haul truck 100 and, as such, may include one or more operational interfaces such as gas, brake, and steering as well as truck bed controls, and other control interfaces. The cab 108 may be located relatively high on the haul truck 100 to allow for visibility by the operator in front of and to the sides of the haul truck. In one or more embodiments, the cab may be arranged above the height of the traction system 106 as shown. It is to be appreciated that while a cab 108 is shown, the haul truck 100 may be operable autonomously as well as via an operator present in the cab 108. In one or more embodiments, where on-truck operation by an operator is not provided, the cab 108 may be omitted, for example.

The access platform 110 may be configured to provide an operator with access to the cab 108. For example, as shown, the access platform 110 may include a stairway 116 extending from ground level upward to a height above the traction system 106. The access platform 110 may be arranged on the frame 102 and provide a relatively flat walking and supporting surface above the traction system 106. In one or more embodiments, the access platform 110 may provide a support surface for other equipment such as hydraulic reservoirs, brake fluid tanks, air tanks, and/or other systems and components.

The truck bed 112 may be configured for receiving and holding large quantities of material. As shown, the truck bed 112 may include a large bucket like system arranged generally on the rear of the haul truck 100. The large bucket like system may include a forward sloping bottom, sidewalls, a front wall arranged behind the cab 108, and a protective platform or canopy 118 extending forwardly from a top edge of the front wall and above the cab 108 and over the access platform 110. The truck bed 112 may be articulable in a pivoting motion relative to the frame 102 via a hydraulic cylinder or cylinders to allow for selective dumping of the material within the bed 112.

As shown and mentioned, the haul truck 100 may include the antenna support structure 114 for the receiver 120. The antenna support structure 114 may be adapted to provide a support location for the receiver 120 outside of the protective overhead coverage of the canopy 118, such that the canopy 118 is not located over the vertical axis of the receiver 120. For example, the receiver 120 can be positioned in front of the canopy 118 or to a front corner side of the canopy 118 and at a height sufficient to allow the receiver 120 to extend above the height of the truck bed 112 and the canopy 118 to allow for a 360 degree field of view.

As shown, the antenna support structure 114 may be supported by and/or secured to the access platform 110 and be arranged generally below the canopy 118. The antenna support structure 114 can then extend upward and forward from the access platform 110 and may provide support for the receiver 120 towards a front of the canopy 118. The antenna support structure 114 may be arranged at a height generally flush with or near a bottom of the canopy 118 such that when the receiver 120 is mounted thereon, the receiver 120 extends above the canopy 118 so as to have a 360 degree coverage.

As used herein, the receiver 120 can include any of a GNSS or GPS receiver, a GNSS or GPS antenna, or a GNSS or GPS receiver antenna. As noted, the receiver 120 can be positioned in front of or to the side of a front edge 119 the canopy 118, such that the receiver 120 is not protected by the canopy 118. The receiver 120 can be positioned so that a top of the receiver 120 is higher than an upper surface of the canopy 118 such that the receiver 120 is higher than the canopy 118.

As noted, a problem that can arise is falling debris striking the relatively open receiver 120 of the haul truck since the receiver 120 is positioned outside of the protective coverage of the canopy. Current guarding methods for protection of GNSS/GPS receiver antennas at the front of mining trucks currently utilize large metal guards. However, such metal guards typically interfere with the GNSS signal. If the guard is low enough to avoid disruption of the GNSS signal, the potential arises for material to travel over the top of the metal guard striking the receiver and rendering the guard ineffective.

As will be detailed below, the present system includes a protective barrier located towards the front of the canopy of a mining truck for autonomous applications to provide additional protection for the receiver(s) 120 that are attached to the support structure 114 on the front of the truck 100. The protective barrier can be constructed of non-metallic material and function as a canopy extension that can extend above the height of the GNSS receivers, providing protection from rocks that may otherwise bounce over existing guards, while not interfering with the GNSS signals.

Figure 2:
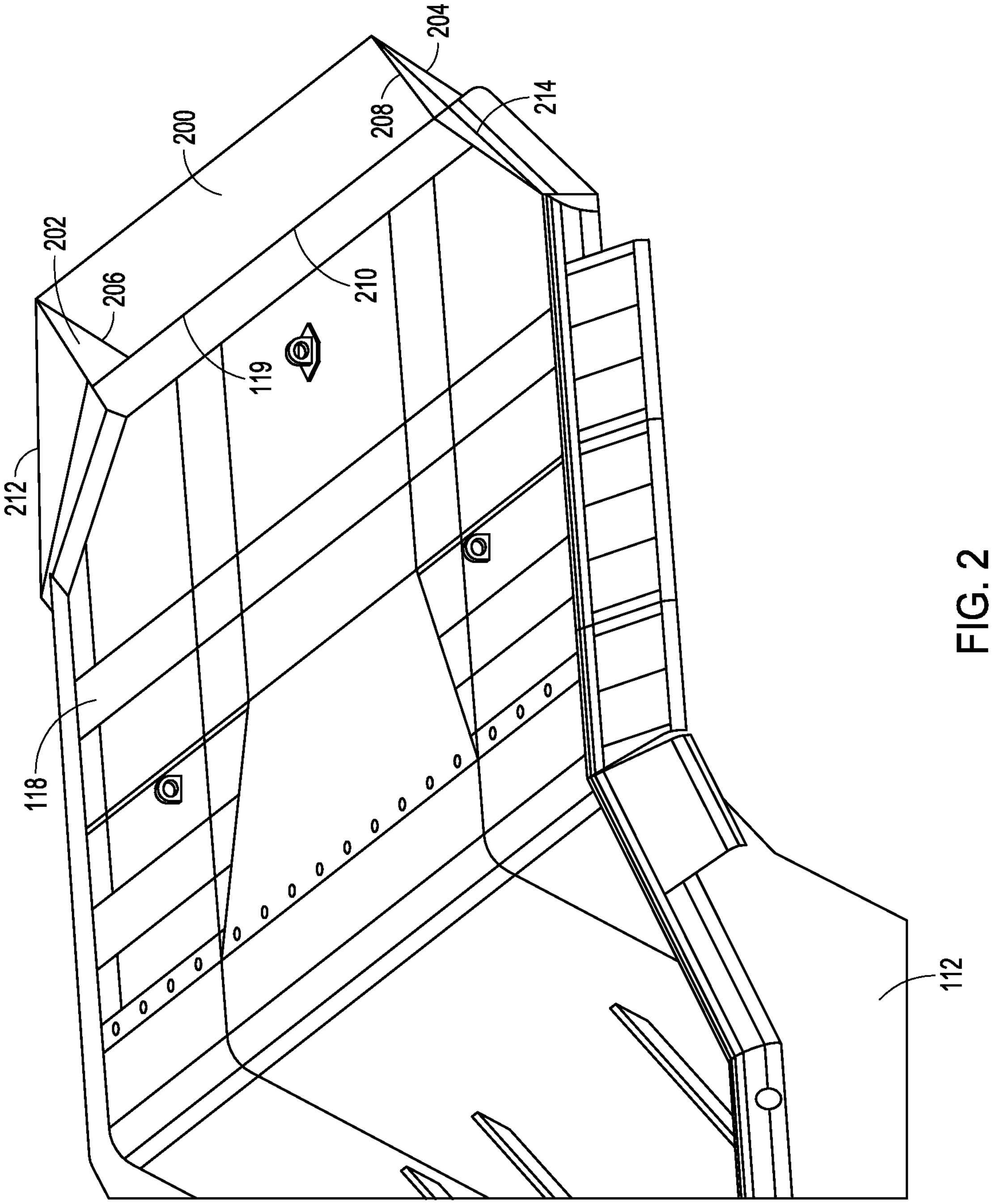
FIG. 2 shows a top perspective view of a protective barrier for the haul truck, in accordance with one embodiment.
Figure 3:
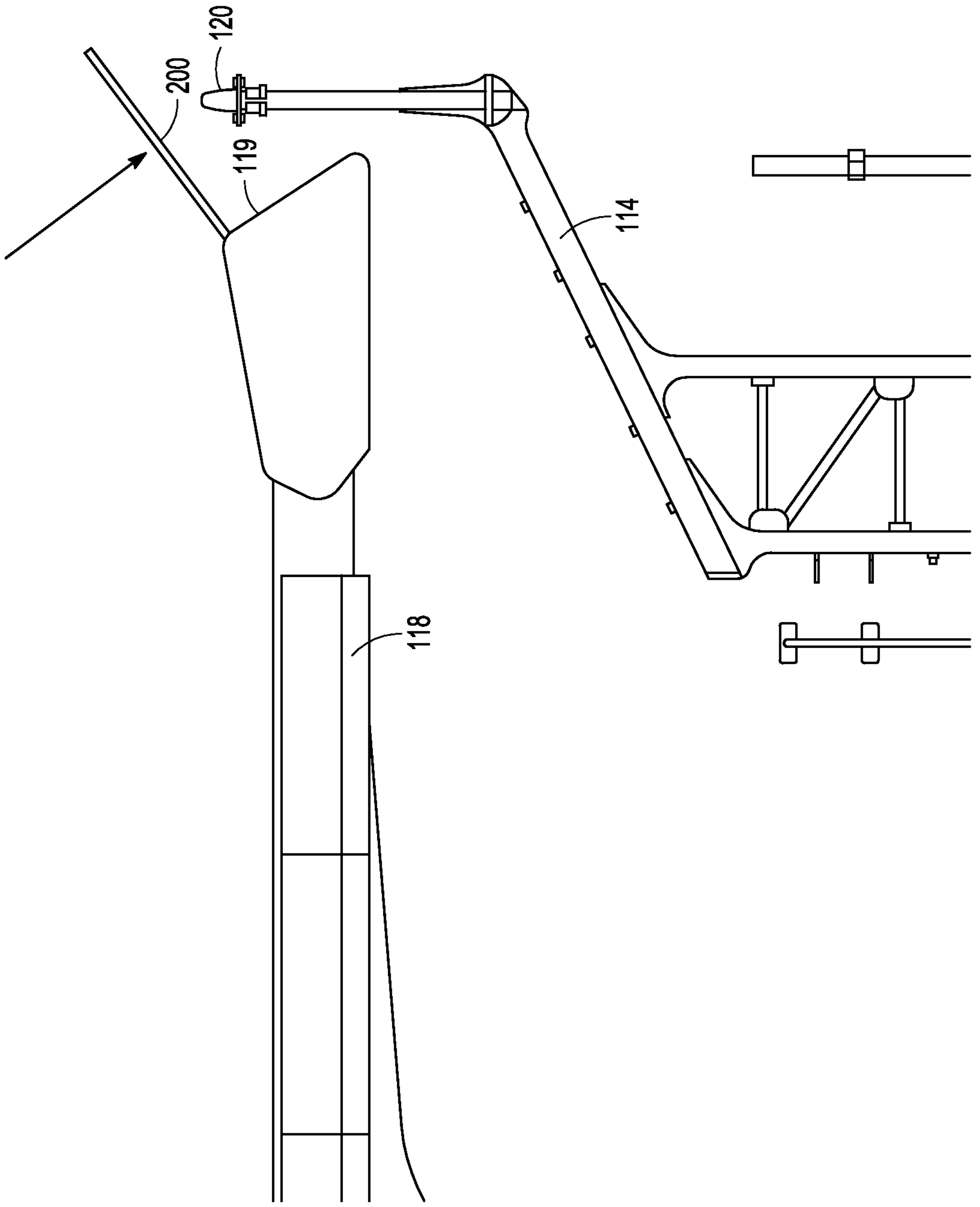
FIG. 3 shows a schematic side view of the protective barrier and a receiver, in accordance with one embodiment.

For example, FIG. 2 shows a top perspective view of a protective barrier 200 for the haul truck, in accordance with one embodiment, and FIG. 3 shows a schematic side view of the protective barrier 200 and the receiver 120.

In this example, the protective barrier 200 can be coupled to and stretched between the outer edges of the canopy 118 and coupled proximate a front of the canopy 118 at the front edge 119 of the canopy 118 and positioned to deflect objects from striking the GNSS receiver 120. In one example, the protective barrier 200 can be wide enough so to be as wide is the front edge 119 of the canopy 118. As will be discussed below, in some embodiments, the protective barrier can cover the side or front corner edges of the canopy 118 also. In one example, the protective barrier 200 can extend beyond the outer front edge 119 of the canopy 118 at an angle so as to be positioned over the top of the receiver 120. For example, referring to FIG. 3, the protective barrier 200 can be sized and positioned so as to be positioned over the vertically extended axis of the receiver 120. The protective barrier 200 is configured and positioned to deflect objects from hitting the receiver 120. Accordingly, the protective barrier 200 acts as an extension of the canopy 118.

In one embodiment, the protective barrier 200 can be coupled between first and second braces 202, 204 attached to the canopy 118 and located at the front edge 119 of the canopy 118 with the first brace 202 on one side of the canopy 118 and the second brace 204 on an opposite side of the canopy 118. The first and second braces 202, 204 can be angled outward from the leading edge 119 of the canopy 118. In one example, the braces 202, 204 can be detachable and easily replaceable. For example, the braces 202, 204 can be metallic members bolted or otherwise removable fastened to the leading edge of the canopy 118. The protective barrier 200 can be stretched between and fastened at both ends to the respective braces 202, 204. For example, first and second edges 206, 208 of the protective barrier 200 can be bolted or otherwise fastened to the braces 202, 204, respectively. A bottom edge 210 of the protective barrier 200 can be loose from, or attached to, the canopy 118 at the front edge 119, if desired.

In one embodiment, first and second support members 212, 214, such as guy wires, can be attached at one end to an upper end of the first and second braces 202, 204, respectively, and attached at a second end to the canopy 118. In other embodiments, the support members 212, 214 for the braces 202, 204 can include a plate that extends from a side of the canopy to the braces 202, 204, or the support could be provided by a second (and third) non-metallic protective barrier elements positioned where the support members 212, 214 are shown.

The protective barrier 200 can include a non-metallic material configured to not interfere with the GPS signal being received by the receiver 120. In one example, the protective barrier 200 can include a flexible mesh material. For example, the flexible mesh material can include a cargo net webbing, or a nylon mesh or netting strong enough to not be torn by rocks and heavy objects falling into the protective barrier 200. In one example, the protective barrier 200 can include a solid, non-metallic barrier material, such as a polycarbonate plate.

Depending on the size of the haul truck 100, the protective barrier 200 can have a width up to the width of the front edge of the canopy 118 and have a height necessary to provide protective coverage of the receiver 120. In one example, the non-metallic protective barrier 200 and the braces 202, 204 can have an angle relative to the canopy 118 of between 0 degrees to 90 degrees. In one example, the non-metallic protective barrier 200 and the braces 202, 204 can have an angle relative to the canopy of about 45 degrees. In some examples, the protective barrier 200 extends over and covers the vertical axis of the receiver 120. In other examples, the protective barrier 200 can be positioned to extend 90 degrees vertically so as to be above (higher than, but not necessarily over) the receiver 120 to protect the receiver 120 from falling materials, while still permitting the receiver 120 to have a 360 degree field of view.

Figure 4:
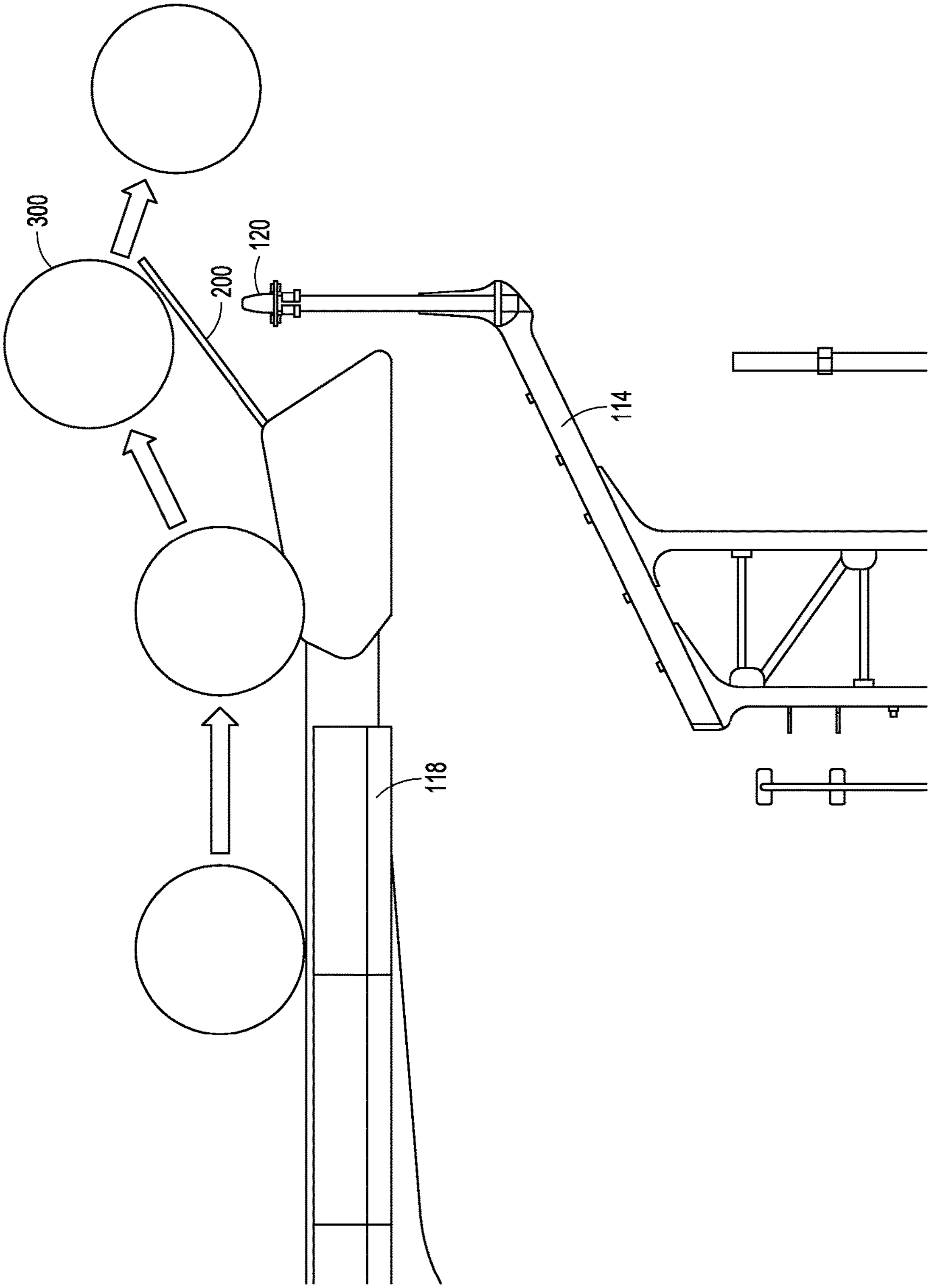
FIG. 4 shows a schematic side view of the protective barrier in use, in accordance with one embodiment.

FIG. 4 shows a schematic side view of the protective barrier 200 in use, in accordance with one embodiment. Here, it is shown how rocks or other objects 300 that roll/bounce can be deflected from striking the receiver 120 by the protective barrier 200 unless the protective barrier 200 is overloaded by force.

Figure 5:
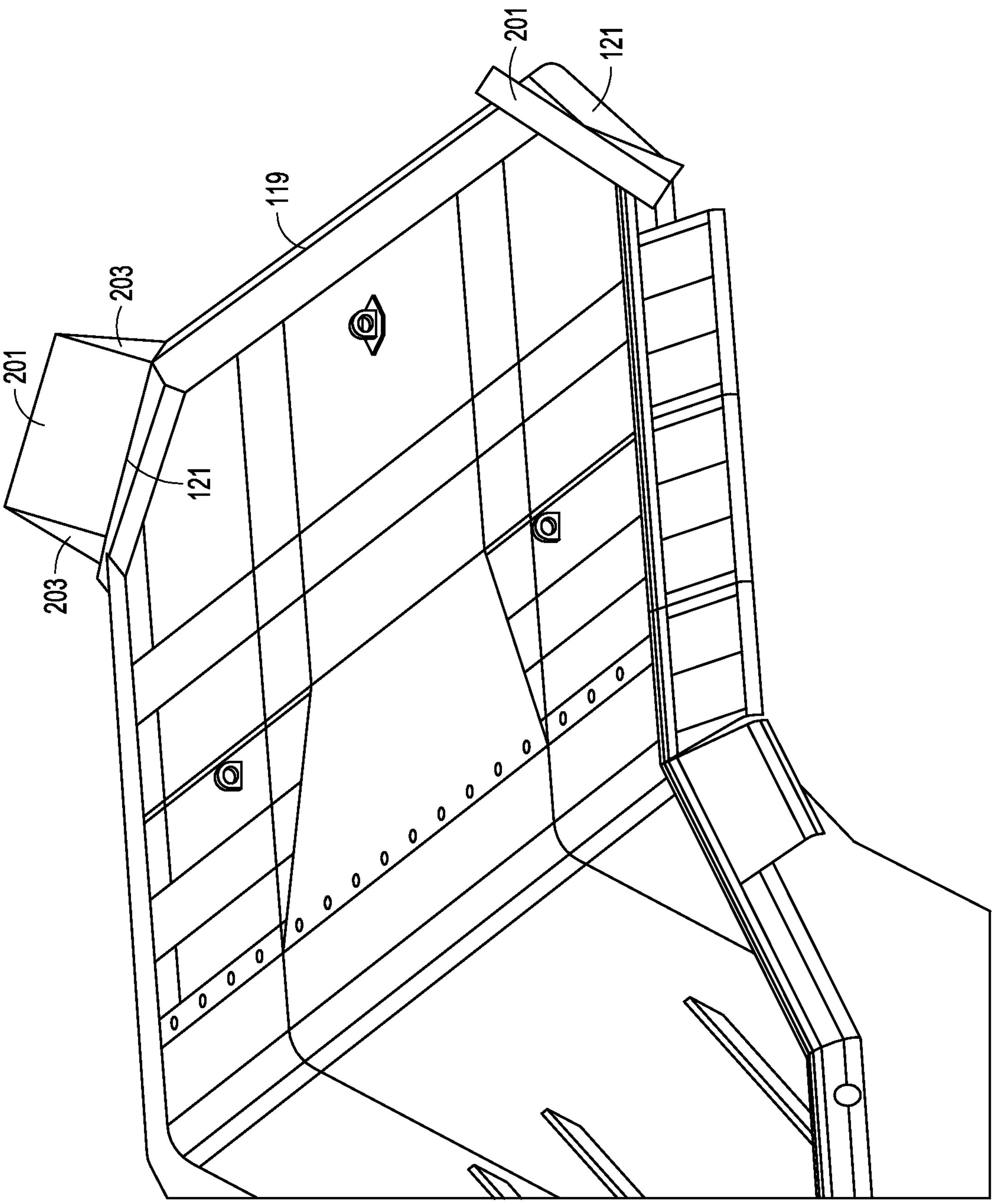
FIG. 5 shows a top perspective view of a protective barrier for the haul truck, in accordance with one embodiment.

FIG. 5 shows a top perspective view of a protective barrier 201 for the haul truck, in accordance with one embodiment. In this example, one or more protective barriers 201 can be positioned at front corner edges 121 proximate a front of the canopy 118. The protective barrier(s) 201 can be held in place by one or more braces 203 attached to the canopy 118. In this example, if the receiver 120 (FIG. 1) were located towards the front corner sides of the canopy 118 instead of directly in front of the canopy 118, the protective barriers 201 would provide protection, as discussed above. Again, as discussed above, protective barriers 201 can be made of a non-metallic material so as not to interfere with the GPS signals while still providing protection. The protective barriers 201 can also be angled out from the canopy 118, as discussed above.

In one embodiment, the examples of FIG. 2 and FIG. 5 can be combined and the protective barriers 200, 201 can be located around all the front edges of the canopy 118, including the front edge 119 and the front corner edges 121.

INDUSTRIAL APPLICABILITY

The present system is applicable to a haul trucks configured for hauling heavy rock, debris, equipment, or other items. In one or more embodiments, for example, the haul truck may be adapted for working in a rock quarry where rock mining and digging is performed and the mined material is in need of transport to crushers, other processing equipment, or to trucks more suitable for over-the-road transport. The present system is especially applicable to hauls trucks that are autonomous or semi-autonomous utilizing GNSS navigation.

Referring again to FIGS. 1-5, in use, the present system provides a method of protecting a GNSS receiver mounted on a haul truck. The method can include providing a non-metallic protective barrier 200, 201 and mounting the non-metallic protective barrier 200, 201 proximate a front of a canopy 118 of the haul truck to provide a canopy extension positioned over the GNSS receiver of the haul truck. The non-metallic protective barrier 200, 201 can be mounted towards a front edge or front corner edges of the canopy 118 to provide a canopy extension positioned to deflect objects from striking the GNSS receiver 120, which can be positioned in front of a front edge of the canopy, or off to a front corner side, or otherwise not protected by the canopy 118.

In one example, the protective barrier 200 can be coupled between first and second braces 202, 204 attached to the canopy 118 and located at the front edge 119 of the canopy with the first brace on one side of the canopy and the second brace on an opposite side of the canopy. In an example, first and second support members 212, 214 can be attached to an upper end of the first and second braces and attached to the canopy. In one example, one or more protective barriers 201 can be mounted to the front corner edges 121 of the canopy 118, in addition to, or instead of, the protective barrier 200.

The protective barrier(s) 200, 201 can be a flexible mesh material, such as a cargo net webbing or a nylon mesh. In one example, the protective barrier can be a solid non-metallic barrier material, such as a polycarbonate plate extending across the width of the front edge of the canopy. The protective barrier 200, 201 acts as a canopy extension and is configured and positioned to deflect objects from hitting the receiver, while not interfering with the signals being received by the receiver 120.

In one example, the protective barrier 200, 201 can be positioned to extend beyond an outer front edge of the canopy 118 so as to be positioned over the top of the receiver 120. In other examples the protective barrier can be angled between 0 degrees to 90 degrees relative to the canopy.

In summary, the present system can include a non-metallic canopy extension for a mining truck, the canopy extension can include two side braces that can extend at an angle outward from a leading edge of the canopy, and a non-metallic barrier can extend between the two braces. Additional support elements, such as guy wires, can extend from a side of the canopy to the braces. The specific angles of the braces and position of the protective barrier relative to the canopy can vary. The material of the barrier can be solid or mesh, it can be flexible material, designed to be detachable/replaced, or it can be a solid material, such as a polycarbonate panel. The protective barrier system discussed herein can be provided as a retrofit for an existing vehicle or can be installed on the original equipment.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A haul truck, comprising:

a frame;

a traction system for moving the frame;

an access platform coupled to the frame;

a truck bed having a canopy extending over the access platform;

an antenna support structure arranged on the access platform, the antenna support structure extending upward to support a GNSS receiver positioned proximate a front of the canopy and positioned outside of a protective overhead coverage of the canopy when the canopy is in a lowered position; and a non-metallic protective barrier separate from the canopy and coupled to the canopy at a front edge of the canopy so as to form a canopy extension and positioned to deflect objects from striking the GNSS receiver.

2. The haul truck of claim 1, wherein the non-metallic protective barrier extends beyond an outer edge of the canopy so as to be positioned over a top of the GNSS receiver.

3. The haul truck of claim 1, wherein the non-metallic protective barrier is coupled between first and second braces attached to the front of the canopy.

4. The haul truck of claim 3, further including first and second support members which are attached to an upper end of the first and second braces and attached to the canopy.

5. The haul truck of claim 1, wherein the non-metallic protective barrier includes a flexible mesh material.

6. The haul truck of claim 5, wherein the non-metallic protective barrier includes a cargo net.

7. The haul truck of claim 1, wherein the non-metallic protective barrier includes a polycarbonate panel.

8. The haul truck of claim 1, wherein the non-metallic protective barrier has an angle relative to the canopy of between 0 degrees to 90 degrees.

9. The haul truck of claim 8, wherein the non-metallic protective barrier has an angle relative to the canopy of about 45 degrees.

10. A canopy extension for a haul truck, the canopy extension comprising:

a non-metallic protective barrier coupled to a canopy of the haul truck, wherein the protective barrier is separate from the canopy and positioned towards a front of the canopy as a canopy extension and positioned to deflect objects from striking a GNSS receiver, which is positioned outside of a coverage of the canopy.

11. The canopy extension of claim 10, wherein the non-metallic protective barrier extends beyond an edge of the canopy so as to be positioned over a top of the GNSS receiver.

12. The canopy extension of claim 10, wherein the protective barrier is coupled between first and second braces attached to the canopy.

13. The canopy extension of claim 12, further including first and second support members which are attached to an upper end of the first and second braces and attached to the canopy.

14. The canopy extension of claim 10, wherein the protective barrier includes a flexible mesh material.

15. The canopy extension of claim 10, wherein the protective barrier includes a polycarbonate panel.

16. The canopy extension of claim 10, wherein the non-metallic protective barrier has an angle relative to the canopy of between 0 degrees to 90 degrees.

17. The canopy extension of claim 16, wherein the non-metallic protective barrier has an angle relative to the canopy of about 45 degrees.

18. A method of protecting a GNSS receiver mounted on a haul truck, the method comprising:

providing a non-metallic protective barrier; and mounting the non-metallic protective barrier towards a front of a canopy of the haul truck, wherein the non-metallic protective barrier is separate from the canopy and is configured to provide a canopy extension positioned to deflect objects from striking a GNSS receiver which is positioned proximate the front of the canopy.

19. The method of claim 18, wherein the non-metallic protective barrier is coupled to the canopy and extends beyond an edge of the canopy so as to be positioned over a top of the GNSS receiver.

20. The method of claim 19, wherein the non-metallic protective barrier is coupled between first and second braces attached to the canopy.

* * * * *